United States Patent
Roussouly et al.

(10) Patent No.: US 12,521,178 B2
(45) Date of Patent: Jan. 13, 2026

(54) METHOD FOR DESIGNING A PAIR OF CONNECTION RODS INTENDED TO BE IMPLANTED ON THE SPINE OF A PATIENT, AND METHOD FOR PRODUCING SUCH A ROD

(71) Applicant: S.M.A.I.O., Saint Priest (FR)

(72) Inventors: Philippe Roussouly, Lyons (FR); Pierre Roussouly, Saint Cyr Au Mont d'Or (FR)

(73) Assignee: S.M.A.I.O., Saint-Priest (FR)

( * ) Notice: Subject to any disclaimer, the term of this patent is extended or adjusted under 35 U.S.C. 154(b) by 665 days.

(21) Appl. No.: 17/798,530

(22) PCT Filed: Feb. 9, 2021

(86) PCT No.: PCT/EP2021/053057
§ 371 (c)(1),
(2) Date: Aug. 9, 2022

(87) PCT Pub. No.: WO2021/160599
PCT Pub. Date: Aug. 19, 2021

(65) Prior Publication Data
US 2023/0088477 A1    Mar. 23, 2023

(30) Foreign Application Priority Data
Feb. 10, 2020 (FR) ...................... 2001285

(51) Int. Cl.
*A61B 17/70* (2006.01)
*A61B 17/56* (2006.01)
(Continued)

(52) U.S. Cl.
CPC .............. *A61B 34/10* (2016.02); *A61B 17/56* (2013.01); *A61B 2017/00526* (2013.01)

(58) Field of Classification Search
CPC ...................... A61B 17/70–7092; A61B 34/10
See application file for complete search history.

(56) References Cited

U.S. PATENT DOCUMENTS 9,848,922 B2 * 12/2017 Tohmeh ............. A61B 17/7086
11,207,132 B2 * 12/2021 Isaacs ..................... G16H 50/50
(Continued)

FOREIGN PATENT DOCUMENTS

| EP | 3 057 525 | 11/2017 |
| EP | 2 273 944 | 5/2018 |

(Continued)

OTHER PUBLICATIONS

International Search Report for PCT/EP2021/053057 dated Apr. 20, 2021, 5 pages.
(Continued)

*Primary Examiner* — Jacqueline T Johanas
*Assistant Examiner* — Steven J Cotroneo
(74) *Attorney, Agent, or Firm* — NIXON & VANDERHYE

(57) ABSTRACT

A method of designing a pair of fixation rods for implantation on a patient's spine includes: modelling the spine: determining a corrected vertebrae position; modelling the corrected spine by: realigning the vertebrae in the frontal plane, rotating the sacral plateau in the sagittal plane, modifying angulation in the sagittal plane between the adjacent plates of the discs, changing angulation between one or two vertebrae in the sagittal plane, and modifying the height of each disc; calculating a point cloud passing through the centers of the vertebral bodies; deducing two point clouds on either side of the first, spaced in the frontal plane by the width of the vertebra multiplied by X, and located in the sagittal plane at a distance equivalent to the depth of the vertebra in the sagittal plane multiplied by Y, X (Continued)

| Coeff | X=1.15 | | | |
|---|---|---|---|---|
| Sagittal plane Profile | actual distance | theoretical distance | variation |
| T11 | 34.03 | 38.88 | 39.1345 | 1% |
| T12 | 36.82 | 41.98 | 42.343 | 1% |
| L1 | 32.71 | 38.03 | 37.6165 | -1% |
| L2 | 34.28 | 39.99 | 39.422 | -1% |
| L3 | 33.67 | 39.06 | 38.7205 | -1% |
| | | | Average deviations | 0% |

Distances are given in mm and Y being a function of the instrumentation connecting the rod to the spine.

20 Claims, 11 Drawing Sheets

(51) Int. Cl.
  *A61B 34/10* (2016.01)
  *A61B 17/00* (2006.01)

(56) References Cited

U.S. PATENT DOCUMENTS

| | | | | |
|---|---|---|---|---|
| 11,576,727 | B2* | 2/2023 | Turner | A61B 34/10 |
| 2002/0183610 | A1* | 12/2002 | Foley | A61B 90/36 |
| | | | | 600/407 |
| 2005/0119593 | A1* | 6/2005 | Gallard | A61B 17/7074 |
| | | | | 600/594 |
| 2009/0149977 | A1* | 6/2009 | Schendel | G16H 50/50 |
| | | | | 700/98 |
| 2009/0249851 | A1* | 10/2009 | Isaacs | A61B 17/02 |
| | | | | 72/31.04 |
| 2010/0191088 | A1* | 7/2010 | Anderson | A61B 34/20 |
| | | | | 606/300 |
| 2011/0265538 | A1* | 11/2011 | Trieu | B21D 7/066 |
| | | | | 72/295 |
| 2012/0191192 | A1* | 7/2012 | Park | A61B 17/7062 |
| | | | | 623/17.11 |
| 2013/0307955 | A1* | 11/2013 | Deitz | A61B 5/4566 |
| | | | | 348/77 |
| 2013/0345757 | A1* | 12/2013 | Stad | A61B 17/7011 |
| | | | | 606/279 |
| 2016/0210374 | A1* | 7/2016 | Mosnier | G06F 30/00 |
| 2016/0354161 | A1* | 12/2016 | Deitz | A61B 34/20 |
| 2017/0119281 | A1* | 5/2017 | Herrmann | A61B 5/0013 |
| 2018/0168539 | A1* | 6/2018 | Singh | A61B 8/4483 |
| 2019/0239926 | A1* | 8/2019 | Pavlovskaia | A61B 17/1703 |
| 2019/0380782 | A1* | 12/2019 | McAfee | A61B 34/10 |
| 2020/0015857 | A1* | 1/2020 | Rout | A61B 17/8863 |
| 2020/0261156 | A1* | 8/2020 | Schmidt | G06T 19/20 |

FOREIGN PATENT DOCUMENTS

| | | |
|---|---|---|
| FR | 3 010 628 | 3/2015 |
| WO | 2019/043426 | 3/2019 |
| WO | WO-2020046219 A1 * | 3/2020 ............. A61B 5/107 |

OTHER PUBLICATIONS

Written Opinion of the ISA for PCT/EP2021/053057 dated Apr. 20, 2021, 8 pages.
French Search Report for 2001285 dated Dec. 9, 2020, 2 pages.
Aubert et al., "Toward Automated 3D Spine Reconstruction from Biplanar Radiographs Using CNN for Statistical Spine Model Fitting", IEEE Transactions on Medical Imaging, IEEE Service Center, Piscataway, NJ, US, vol. 38, No. 12, Dec. 1, 2019, pp. 2796-2806. (Submission Pending).

* cited by examiner

| | Target Type |
|---|---|
| Lumbar Kyphosis | 2 |
| Type 1 + Thoracic kyphosis | 1 |
| Type 1 | 1 |
| Type 1 + elderly scoliosis | 1 OR 2 |
| Type 1 + young scoliosis | 1 OR 2 |
| Type 1 Retroverted | 3 |
| Type 2 + Elderly thoracic kyphosis | 1 |
| Type 2 + Young thoracic kyphosis | 2 |
| Type 2 | 2 |
| Type 2 Retroverted + Thoracic kyphosis | 3 OR 4 |
| Type 2 Retroverted | 3 OR 4 |
| Type 3 Retroverted | 4 |
| Type 3 anteverted with flattened kyphosis | 2 |
| Type 3 anteverted with significant kyphosis | 1 |
| Type 3 - balance | 3 |
| Type 3 - imbalance | 3 |
| Type 4 - false type 3 balanced | 4 |
| Type 4 - false type 3 unbalanced | 4 |
| Type 4 anteverted with flattened kyphosis | 2 |
| Type 4 anteverted with significant kyphosis | 1 |
| Type 4 - balance | 4 |
| Type 4 - imbalance | 4 |
| Global Kyphosis, without retroversion, with Flattened Kyphosis | 2 |
| Global Kyphosis, without retroversion, with Significant Kyphosis | 1 |
| Global kyphosis & retroversion | 3 OR 4 |

FIG. 7

METHOD FOR DESIGNING A PAIR OF CONNECTION RODS INTENDED TO BE IMPLANTED ON THE SPINE OF A PATIENT, AND METHOD FOR PRODUCING SUCH A ROD

CROSS-REFERENCE TO RELATED APPLICATIONS

This application is the U.S. national phase of International Application No. PCT/EP2021/053057 filed Feb. 9, 2021 which designated the U.S. and claims priority to FR 2001285 filed Feb. 10, 2020, the entire contents of each of which are hereby incorporated by reference.

BACKGROUND OF THE INVENTION

Field of the Invention

The present invention relates to fixation rods, also called spinal osteosynthesis rods, intended to be implanted on the spine of a patient, so as to correct pathological deformities by a posterior spinal arthrodesis operation. More particularly, it concerns a method for determining their optimal three-dimensional configuration for a given patient, and the manufacture of these rods according to this configuration.

Description of the Related Art

Surgical operations, called spinal arthrodesis, aim to stabilise a greater or lesser number of contiguous vertebrae, or even to reduce a deformity of the entire spine, i.e. to realign the affected vertebrae in relation to each other in order to improve the overall static shape of the spine. Pairs of metal rods (usually titanium or cobalt-chromium alloy), often in the range of 3.2 mm to 7 mm in diameter, are used to connect spinal implants. These are usually screws implanted on the vertebrae in question, to which the rod is connected via connectors placed on each implant.

Two fixation rods are used simultaneously, implanted along the spine on either side of the spinous processes. In order to take into account the spinal curvatures (lordosis, kyphosis) of each patient, and to make the connection between the rod and the screws possible, each rod of the pair of rods is bent using different techniques.

The most commonly used is manual bending during the operation itself, performed by the surgeon using a manual bending machine with three bending rollers. The determination and realization of the radii of curvature to be imposed locally along the rod is then done according to the surgeon's visual estimation, with the possibility of iterations, during the implantation of the rod, based on the value and the locations of the curvatures to be imposed on the rod. The level of accuracy of this method inevitably varies greatly from one operator to another.

Implant manufacturers offer more sophisticated systems, combining the acquisition of the position in space of the implanted screw heads by means of cameras which make it possible to obtain the coordinates of a series of corresponding points, and the configuring of a bending machine which makes it possible to bend the rod locally based on the desired trajectory, which connects all these points. EP-B1-2 273 944 describes an example of such a system.

It has been proposed in FR 3 010 628 that a sagittal pre-operative X-ray of the patient's spine to be treated, extending from the cervical vertebrae to the femoral heads, be conducted. On this X-ray, the pelvic parameters, the lumbar lordosis, the position of the apical lumbar vertebrae, the SVA and SFD distances and a point cloud are recorded. The morphotype to which the treated spine corresponds is deduced from predetermined morphotypes, as well as the desired postoperative apex point. The correction to be applied to the lumbar segment to be treated is then simulated by defining co-radial arcs below and above the desired postoperative apex point, and by defining two arcs concentric to the two curves obtained, which are tangent to each other at the apex point. After translating these arcs away from the midline of the spine, the rod to be implanted can be modelled in two or three dimensions, curved along those arcs.

It has also been proposed, in the document EP-B1-3 057 525, to measure positional and anatomical parameters on preoperative face and profile standing radiographs of the patient, and to give the possibility, via imaging management tools, to cut the radiographic image of each of the two incidences along different axes, and to carry out rotations between them of the portions of the image thus obtained, in order to simulate the result of a realignment surgery. A spline curve is drawn on this reconstructed image to represent the expected post-operative result. Its coordinates are exported to a CNC bending machine which custom-makes the rod.

It is also known in document WO-A-2019/043426 to add to the geometrical description of the back shape to be obtained, a certain number of calculations by finite elements intended to represent all of the forces acting on the rod once it is implanted. Muscle strength and bone quality are taken into account. The shape of the rod at the time of installation is determined by the type of alloy of which the rod is made, and therefore by its mechanical properties.

It has been shown that providing the surgeon with a digitally bent rod prior to the spinal arthrodesis operation has a threefold benefit. Firstly, it saves time in the operating theatre, sparing the surgeon from having to perform a task that would otherwise take minutes. Secondly, it improves the mechanical strength of the rod, as it avoids the jolts of manual bending that weaken it. Thirdly, the "surgical planning" is accurately translated through bending that carefully respects the shape that the surgeon wishes to give to the spine on the operated segment, whereas manual bending is a source of inaccuracy for this shape.

All the planning techniques aimed at achieving a realignment of the pelvis and spine are now based on simple geometrical criteria. These, however, only imperfectly describe the ideal spine shape for each patient, using chains of correlations between a number of morphological and positional parameters measured on postoperative radiographs of reference patients for whom clinical outcomes have been analysed. The normative values selected were those estimated to be most closely correlated with the measure of satisfactory patient quality of life, based on data collected at the time the radiograph was taken. The calculation of the ideal lordosis, for example, is often crude, and summarizes this curvature to an angle that should be copied from the one describing the shape of the pelvis (pelvic incidence) to within 10°, without taking into account the distribution of angulations between the plates of each disc and each vertebral body.

SUMMARY OF THE INVENTION

The aim of the invention is to provide the surgeon with a pair of rods that induce a realignment of the vertebrae between them as close as possible to a healthy spine, respecting the morphotype of the patient. The invention should enable the surgeon to determine the ideal shape of each rod of the pair before it is produced using a digital bending machine or other programmable bending technique. The curvatures would be described not only in terms of the angulations of the plates of the vertebral bodies at their ends, but also in terms of the angulations of the individual discs that make them up.

To this end, the invention relates to a method of designing a pair of fixation rods for implantation in the spine of a patient suffering from spinal pathology during posterior spinal arthrodesis, wherein:

a three-dimensional model of the pathological spine is constructed as follows:
- at least one image of the patient's spine to be treated is taken by means of a medical imaging method, namely an image showing the spine in the sagittal plane and, if said pathology is three-dimensional, another image showing the spine in the frontal plane in anterior view, the patient being in the same position as for image in the sagittal plane, said images covering at least the area of the spine extending from the cervical vertebra C7 to the end of the sacrum and including the femoral heads of the patient;
- from said image(s), morphological reference points are acquired by placing points on the four vertices of each vertebral body seen in two-dimensional projection in the plane in which each image was taken, so as to define the contours of said vertebral bodies on each image by a quadrilateral;
- a simplified three-dimensional model of each vertebral body is constructed from said image(s) in the form of an elliptical cone frustum for which each vertebral body is represented in the plane of said image(s), or in the respective planes of said image, by a quadrilateral defined by four points placed on the four vertices of each vertebral body seen in two-dimensional projection in said plane(s), where each vertebral body is represented by an ellipse;
- the sacral plateau is defined by a segment in the sagittal plane, if there is no deformation of the spine in the frontal plane, or by an elliptical disc in the sagittal plane if there is a deformation of the spine in the frontal plane at its level, and by an elliptical disc in the frontal plane in all cases to take account of the inclination of the sacrum in the sagittal plane;
- the projections of the contours of the femoral heads in the planes of the images are defined by circles;
- the segment that connects the centre of the circles representing the femoral heads if their projections in the sagittal plane are offset, or the point representing the centre of said circles if they are merged in the sagittal plane, is defined;
- pelvic incidence, sacral slope and pelvic tilt are measured in the images;
- the "C7 plumbline" of the spine is defined on the images and taken as the vertical axis of reference, passing through a point in the middle of the vertebral body;
- the general balance ratio d/D is defined, where d is the distance between the vertical axis passing through the middle of the C7 vertebra and the vertical axis passing through the posterior end of the segment representing the sacral plateau in the sagittal plane, and D is the distance between a vertical axis passing through said posterior end of the segment representing the sacral plateau in the sagittal plane and the middle of the segment which connects the centres of the circles representing the femoral heads or the point representing the centre of said circles if they are merged in the sagittal plane;
- the limits of the lordotic and kyphotic curvatures are defined on the images and the number of vertebrae included in the lumbar lordosis is calculated.

said three-dimensional model is used to classify the patient's pathological spine into a given category of a pre-established classification of pathological or healthy back types, and a future corrected position of the vertebrae of the spine is derived therefrom and aimed at, if necessary, said future corrected position falling within a pre-established category of healthy back types;

the patient's spine is modelled in its future corrected position, taking into account the configurations and positions of the vertebral bodies of the spine, the sacral plateau and the femoral heads, using five tools in succession on the basis of said three-dimensional model:
- using a first tool, the vertebrae are realigned in the frontal plane, according to a percentage of realignment ranging, for each vertebra, from 0%, which corresponds to an absence of realignment, to 100%, which corresponds to perfect parallelism of the lower plates of each vertebral body in the frontal plane and to vertical alignment of the middles of said lower plates;
- using a second tool, the model of the sacral plateau is rotated in the sagittal plane with respect to the centre of the segment joining the centres of the two spheres symbolising the femoral heads by altering the correction of the pelvic tilt;
- using a third tool, the angulation in the sagittal plane between the adjacent plates of each intervertebral disc to be operated on is modified by performing a rotation on each vertebra, the centre of the rotation being the centre of the segment joining the posteroinferior edge of the vertebral body plate of the overlying vertebra and the posterosuperior edge of the vertebral body plate of the underlying vertebra, and the rotation concerning all points overlying the intervertebral disc under consideration, including the two points of the lower vertebral body plate of the overlying vertebra;
- using a fourth tool, the angulation between the upper and lower plates of one or two vertebrae is modified in the sagittal plane, as would be done during a transpedicular osteotomy correction, by performing a rotation whose centre is the centre of the segment joining the anteroinferior edge and the anterosuperior edge of the vertebral body of the vertebra in question, the rotation concerning all the points whose ordinate is greater than that of the centre of rotation;
- and using a fifth tool, the height of each disc, defined as the length of the segment perpendicular to the upper plate of the vertebral body of the underlying vertebra, joining the middle of the latter to the point of intersection with the lower plate of the overlying vertebra, is modified in succession by performing a translation for all the points overlying the disc, including the points forming the lower plate of the overlying vertebra, over a user-defined distance;

a first point cloud is calculated defining a curve passing through the centres of the vertebral bodies on the segments of the spine that have been modified by the model compared to the model of the pathological spine;

two other point clouds are deduced, each located on either side of the first point cloud, spaced in the frontal plane by a distance equivalent to the width of the vertebra multiplied by a factor X, and located in the sagittal plane posterior to the first point cloud at a distance equivalent to the depth of the vertebra in the sagittal plane multiplied by a factor Y, each of said other point clouds defining a curve corresponding to the shape to be imposed on one of the rods of said pair of fixation rods, said factors X and Y making possible to position the configuration curves of the fixation rods on either side of the curve passing through the centre of the vertebral bodies in the frontal and sagittal planes as a function of the type of instrumentation intended to be used to connect the corresponding fixation rod to the spine.

The invention also relates to a method of manufacturing a fixation rod for implantation in the spine of a patient suffering from spinal pathology during posterior spinal arthrodesis, wherein:

the above method of designing a pair of fixation rods to be implanted on the spine of a patient suffering from a spinal pathology, is carried out to determine the shape to be taken by said fixation rod, from one of said two other point clouds;

and shaping at least one fixation rod of said pair of fixation rods by means of a bending machine, to give said fixation rod the shape it is to take, the aforementioned two other point clouds being converted into data usable by the bending machine.

According to additional advantageous features of the design method and the manufacturing method according to the invention:

When using the fifth tool, said translation is combined with a rotation about the centre of rotation of the third tool where it is located after the translation performed by said fifth tool, to restore the height of the disc concerned to a height corresponding to that of a healthy, uncompressed disc.

Said three-dimensional model of the pathological spine is carried out by computer means.

Said two other point clouds are converted into data usable by a rod bending device such as a numerical control bending machine.

Said pre-established category of healthy back types is the Roussouly classification.

Said bending machine is a numerical control machine to which has been supplied said data which it can operate, obtained from the point cloud corresponding to said at least one fixation rod of the pair of fixation rods.

As will be understood, the method according to the invention consists of processing as input data an image (X-rays, scanner, MRI, moiré fringe projections, etc.) for which the size of a pixel of a patient's pathological pelvis-spine complex is precisely known, and in deducing therefrom, by means of steps which will be detailed hereafter, the shape that each of the rods to be implanted on the patient's spine must take in order to restore the pelvis-spine complex to a healthy morphology desired by the surgeon. This treatment is typically combined with a digital bending machine or equivalent device, capable of bending each rod according to the recommendations resulting from the application of the method according to the invention.

The invention consists, in a first step, of converting the imagery into a two- or three-dimensional model of the spine, in which each vertebra is represented by an elliptical cone frustum, each femoral head by a sphere, and the sacral plateau by an ellipse. Most commonly, the modelling will be three-dimensional. But if it is known in advance that the patient's spine-pelvis deformity is present strictly in the sagittal plane and that its correction should not result in additional deformity in the frontal plane, two-dimensional modelling may be sufficient.

This modelling then allows the measurement of positional parameters of the vertebrae relative to one another and of the femoral heads relative to the sacral plateau, as well as a morphological parameter describing the shape of the pelvis, which will be used to classify each patient into a predefined type of pathological alignment. Each type of pathological alignment will be matched by a type of healthy alignment that sets the key morphological parameters within a range of so-called normal values, which will serve as a target for the restoration of a satisfactory balance of the patient's spine and pelvis.

Tools for positional modification of each element of the pelvis-and-spine model, accurately simulating the possible effects of surgery on their alignment, in order to suggest a realignment configuration, are provided by the invention. The user will be able to see, with each modification induced by these tools, to what extent the positional parameters of the vertebrae and the pelvis will achieve so-called "normal" values for the target configuration that is being sought.

Once modifications to the pelvis-spine model (either at the surgeon's discretion or using an algorithm to be described later) have achieved the target configuration, the surgeon will be able to choose which segments will be fused during rod placement.

The configurations of each rod, typically parallel to the spline curve passing through the centre of the vertebral bodies of the segments in question, are exported in the form of a point cloud providing three-dimensional bending instructions to a bending machine, or any other programmable bending device, which then allows a pair of rods to be made which respect, with a given tolerance, the shape that it is desired to impart to the spine on the vertebral segment to be operated on.

BRIEF DESCRIPTION OF THE DRAWINGS

The invention will be better understood by means of the following description, given with reference to the following attached figures:

FIG. 4a the quadrilaterals modelling a given vertebral body (in this case the vertebral body of vertebra L3) shown also within the spine, viewed from the side and front, and (FIG. 4b) the bounding box deduced from these quadrilaterals and how it is deduced from the quadrilaterals in FIG. 4a;

FIG. 7 shows the correspondence between the different types of spine defined in FIG. 6 and the type of healthy spine according to four-type Roussouly classification in which the fixation rods designed according to the invention must treat a pathological spine of a given type;

DESCRIPTION OF THE PREFERRED EMBODIMENTS

Figure 1:
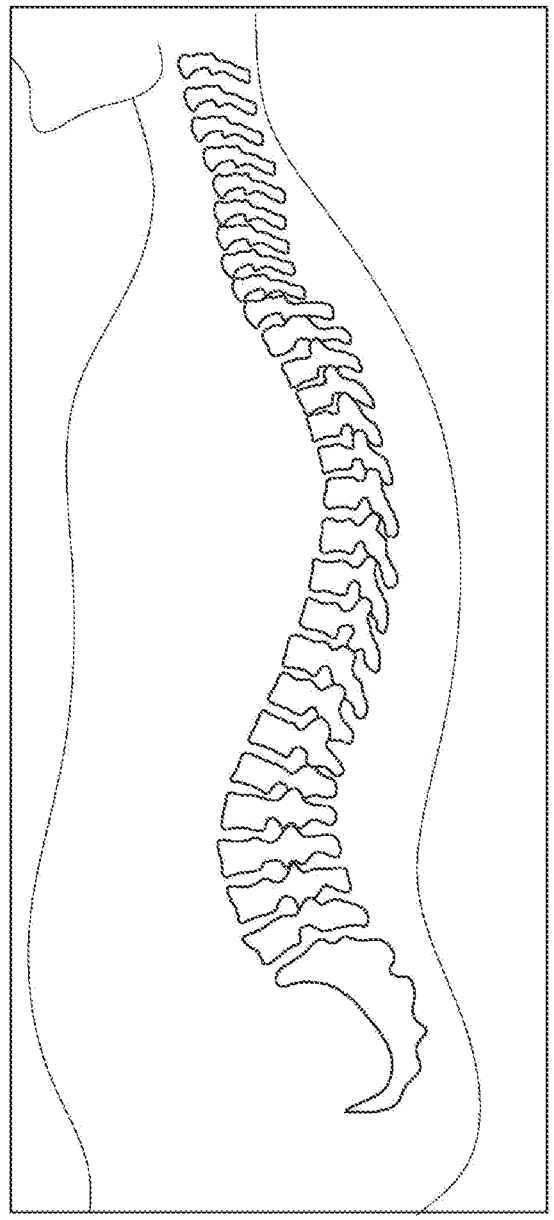
FIG. 1 shows a sagittal diagram of the spine of a patient with severe scoliosis.

The first stage of the invention consists of taking images of the patient to be treated by any medical imaging process: radiography, scanography, MRI, etc. The technique used must be capable of defining the contours of the vertebrae with sufficient clarity so that the points to be taken into account in the subsequent process according to the invention have their positions defined with suitable precision. The patient is standing still in a standard position. Diagrams of the spine resulting from such images are shown in FIG. 1 for an image in the sagittal plane, and in FIG. 2 for an image in the anterior frontal plane.

Figure 2:
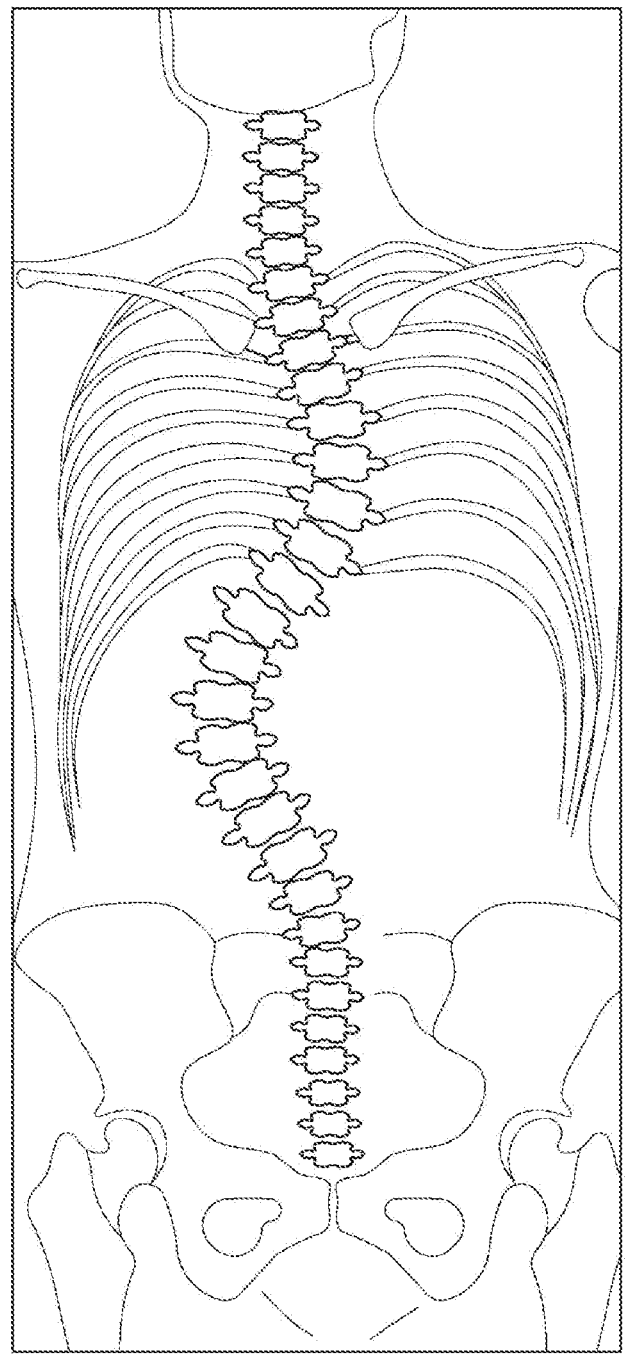
FIG. 2 shows a frontal diagram of the spine of the same patient.

If it is known in advance that the patient has only a two-dimensional spinal pathology, limited to the sagittal plane, it is sufficient to take a single series of images, showing the spine in the sagittal plane, in right or left view. On the other hand, if the pathology is three-dimensional, as in the case of scoliosis (as shown in FIGS. 1 and 2), two series of images should be taken, preferably simultaneously, or taken without patient movement between the two series. Typically, one of the series shows the spine in the sagittal plane in right or left view (in the example described and shown, all the figures showing the spine in the sagittal plane were taken in left view, as in FIG. 1), the other series in the frontal plane in anterior view (as in FIG. 2), in any case in two strictly orthogonal planes. It is under these conditions that a faithful image of the spine and the poor positioning of the vertebrae, which the installation of spinal osteosynthesis rods that the invention aims to adequately shape is expected to remedy, can be reconstructed.

Images should be available that cover the area from at least the C7 cervical vertebra to the femoral heads.

The osteosynthesis rod will only extend over part of the spine since in all cases, as is usual, it will not be connected to the cervical vertebrae and the whole of the sacrum (but it may be connected to the S1 vertebra, particularly in cases of relative malpositioning of the L5 and S1 vertebrae).

However, a correction in a pathological area of the spine inevitably has an influence on more or less neighbouring healthy areas, and having a model that takes into account the whole of the spine and pelvis (excluding the upper cervical vertebrae, which would not be affected by the correction and its model) makes it possible to assess the overall rebalancing of the spine and pelvis induced by the surgery, as well as the compensations on the overlying and, possibly, underlying non-fused vertebral segments.

It is necessary to consider the patient's pelvis in the modelling for two reasons.

Firstly, the morphology of the pelvis is one of the determining factors for the classification of the patient's back, as seen in the images, into one of the classically known types of healthy or pathological backs, which requires good visibility of the sacral plateau and the femoral heads in sagittal view. Criteria for creating an example of such a ranking will be detailed below.

Secondly, imbalances in the alignment of the vertebrae are often accompanied by compensation in the pelvis (retroversion or anteversion), which allows the patient to limit the imbalance in their general statics, at the cost of efforts which are often painful for them. In concrete terms, this compensation translates into a rotation of the pelvis around the axis passing through the centre of the femoral heads in sagittal view.

Taking the pelvis into account means that the amount of correction required to realign the spine would not be underestimated. If it is adequate, the realignment will naturally be accompanied by a disappearance of the compensatory effect previously observed in the pelvis, which will no longer be useful to the patient in trying to maintain their balance.

The images are first converted into computer files containing the size of a pixel, typically according to the DICOM standard for computer management of medical imaging data. Alternatively, a validated graduated distance scale can be attached to the images to allow manual calibration. For this purpose, two points are acquired on the imaging plate, the actual spacing of which is known thanks, for example, to a radio-opaque calibration tool, such as a radio-opaque ball, of known size. These dimensions are entered into the software to find out the size of a pixel.

Figure 3:
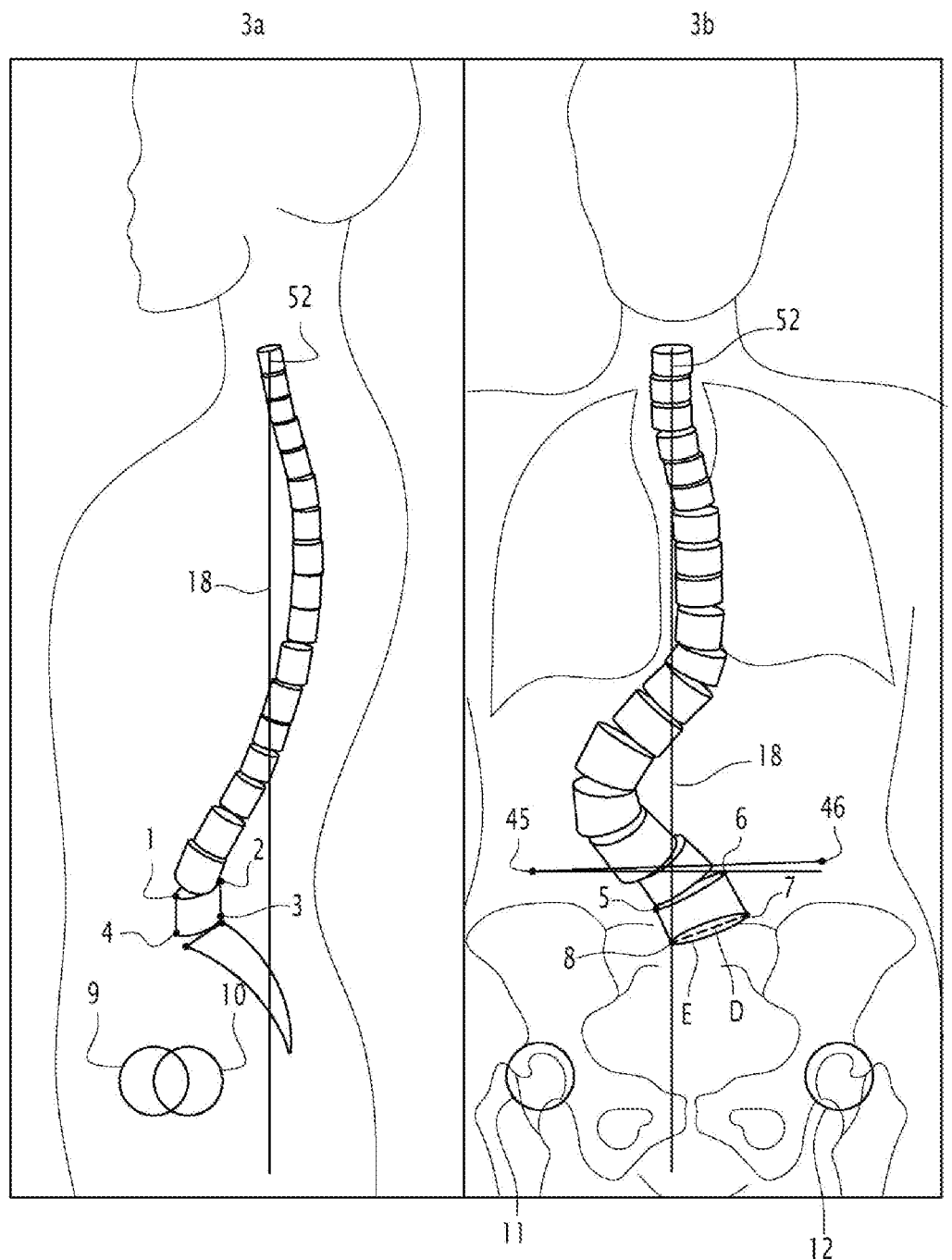
FIG. 3 shows portions of the diagrams in FIGS. 1 (FIGS. 3a) and 2 (FIG. 3b) in which the vertebral bodies have been modelled as elliptical cone frustums and characteristic points, and the sacral plateau as an ellipse and its major axis, as well as the vertical line classically known as the "C7 plumbline" which passes through the centre of the vertebral body of the cervical vertebra C7.

The next step is to acquire key morphological markers on the images. This is preferably done by means of dedicated modelling software that allows points to be placed on the radiographic image(s). FIG. 3 shows radiographic images taken in the sagittal plane in the left profile view in the example shown (FIG. 3a) and in the frontal plane in the example shown (FIG. 3b) of a patient with severe scoliosis, i.e. a three-dimensional pathology which requires the use of two images taken in orthogonal planes for its correction. For the vertebrae, on each photograph showing the spine in the sagittal plane and, if necessary, in the frontal plane, points 1, 2, 3, 4 (FIG. 3a) and, if necessary, 5, 6, 7, 8 (FIG. 3b) are placed on the four vertices of each vertebral body seen in two-dimensional projection in the plane of the photograph, so as to define its contour by a quadrilateral in each plane. FIGS. 3 and 4a illustrate this for the L5 and L3 vertebrae respectively. The same locating task is carried out on the other vertebrae taken into account by the model, which are marked on FIGS. 3a, 3b.

The upper and lower plates of each vertebra are each definable by an ellipse and its major axis, often clearly visible radiologically.

The sacral plateau is represented, in sagittal view as a segment if there is no frontal plane spinal deformity at its level, or by an elliptical disc in the sagittal plane if there is a frontal plane spinal deformity, and in frontal view, as an elliptical disc E, and by a segment D which constitutes the major axis of the ellipse E, as seen in FIG. 3b. This allows the inclination of the sacrum in the sagittal plane to be taken into account Since, as explained, the two sagittal and frontal views are taken simultaneously, or without any change in the patient's position between each image, the view in which the vertebra is best visualised allows us to extrapolate the modelling of the vertebra to the other image where it would be less visible, or to refine this modelling because we are easily able to know the latitude (i.e. the vertical position with respect to any reference point) of the vertebra to be reconstructed.

The femoral heads are also defined as circles 9, 10, in profile view and, if applicable, 11, 12 in front view, as shown in FIGS. 3a, 3b, 5a, 5c, 8b. It is preferable that the circles 9, 10 representing the femoral heads in the sagittal plane be superimposed, or at least slightly offset, as in FIG. 3a. Too much shift in the antero-posterior plane is indicative of a rotated position of the pelvis, which may alter future measurements.

Other significant points on the patient's skeleton, such as the apexes 45, 46 of the pelvic iliac bones (see FIG. 3b), or the posterior wall of the sacrum and points that together are representative of the curvature of the spine, may also be acquired at this time, if this is deemed useful in refining the modelling.

The locations of the surveyed points are entered into the modelling software.

Figure 5:
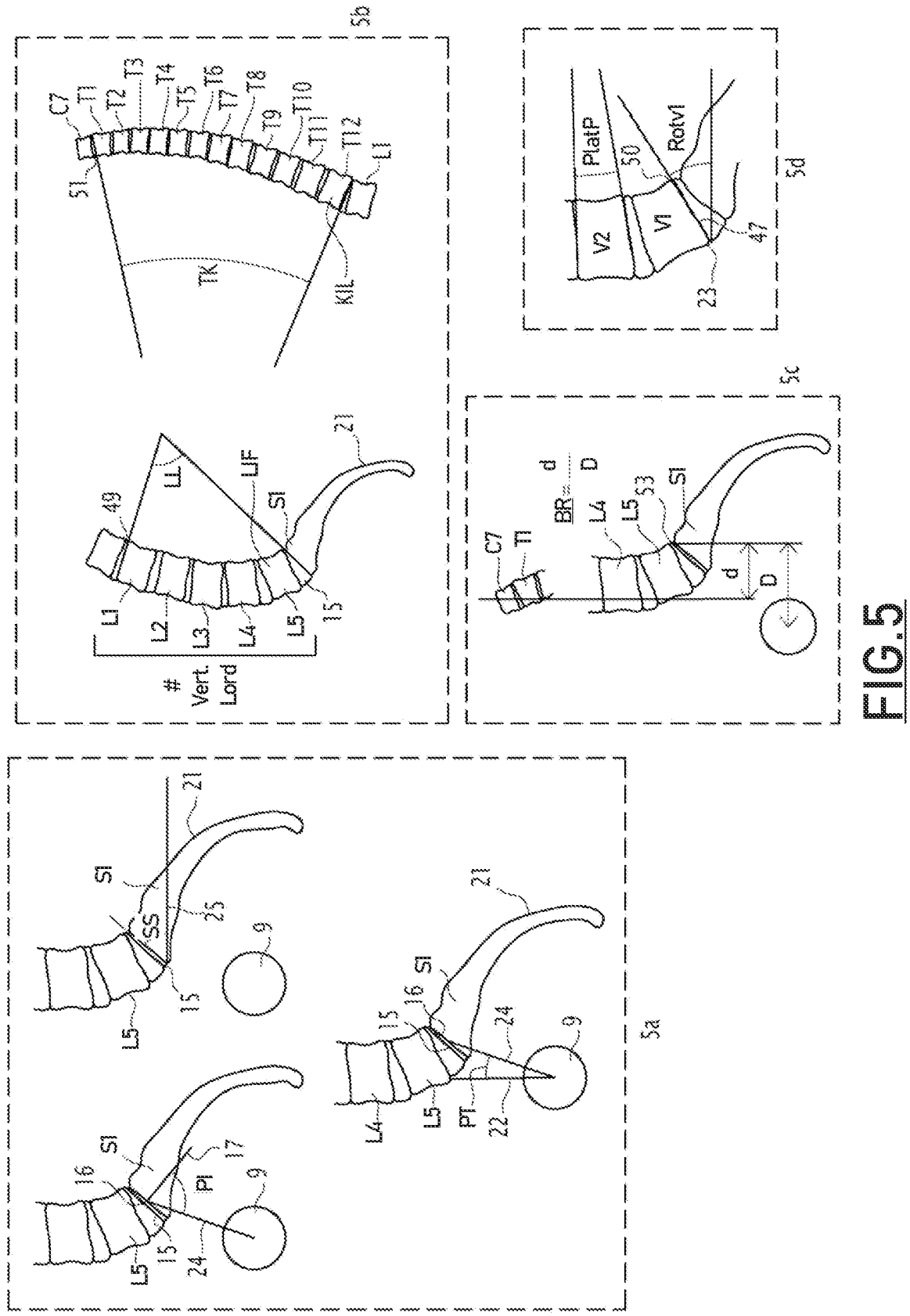
FIG. 5 shows portions of the spine viewed in the sagittal plane, and illustrates various quantities that the modelling takes into account, namely pelvic parameters (FIG. 5a), parameters describing the shape of the back (FIG. 5b), equilibrium parameters (FIG. 5c) and local parameters relating to two adjacent vertebrae (FIG. 5d)

Once the morphological landmarks have been acquired on the imaging film, morphological and positional parameters will be calculated, as shown in FIG. 5. They can be classified into four categories: Pelvic parameters (FIG. 5a), back shape parameters (FIG. 5b), global equilibrium parameters (FIG. 5c) and local parameters (FIG. 5d), the latter taking into account any pair of neighbouring vertebrae, while the other three categories take into account the whole spine or specific parts of it.

The pelvic parameters that are calculated and shown in sagittal view in FIG. 5a are:
- pelvic incidence (PI), i.e. the angle between the line 24 connecting the centre of the femoral heads 9 and the middle 16 of the upper plate 15 of S1 and the perpendicular 17 to the plate 15;
- the sacral slope (SS), i.e. the angle formed between the upper plate 15 of S1 and the horizontal 25;
- pelvic tilt (PT), i.e. the angle between the line 24 connecting the centre of the femoral heads 12 and the middle 16 of the upper plate 15 of S1 and the vertical 22.

The back shape and local parameters, which are calculated and illustrated in sagittal view in FIGS. 5b and 5d, are as follows.

Rot(Vn), for a given vertebra Vn, is the angle formed by the lower plate 47 of said vertebra Vn and the horizontal as illustrated in FIG. 5d for vertebra V1. By convention, the parameter Rot(Vn), for a given vertebra Vn, is positive if the anterior-inferior border 23 of vertebra Vn is at a lower latitude than the posterior-inferior border 50 of the same vertebra. It has a negative sign if it is not.

Starting from the sacral plateau 15, any vertebra noted Vn is considered to be included in a lordotic curvature if one of the following two conditions is met:

$$Rot(Vn) < Rot(Vn-1);$$

or $Rot(Vn) < Rot(Vn-2)$ where Vn−1 and Vn−2 are the two contiguous vertebrae whose latitude is immediately below that of Vn (e.g. if Vn=L3, Vn−1=L4 and Vn−2=L5, see FIG. 5b).

On the other hand, any vertebra is considered to be included in a kyphotic curvature if one of the following two conditions is met: Rot(Vn)>Rot (Vn−1) or Rot(Vn)>Rot (Vn−2).

The number of vertebrae included in the lordotic curvature can then be calculated and is noted in FIG. 5b as "Nb Vert. Lord" and extends from L1 to L5 inclusive in the case shown The latitude of the lowest vertebra of the first lordotic curve, noted LIF ("Lordosis Inferior Limit") in FIG. 5b, can also be defined, which takes the value 1 if, as shown in FIG. 5b, it is S1, the value 2 for L5, the value 3 for L4, etc.

The latitude of the lowest vertebra of the first kyphotic curve is also defined as KIL ("Kyphosis Inferior Limit") in FIG. 5b, the value of which is calculated in the same way. In the case shown in FIG. 5b, this first kyphotic curvature extends across the thoracic part of the spine from T12 to T1 and follows the first lordotic curvature.

The angle of lumbar lordosis, noted LL in FIG. 5b, can be calculated as the angle formed by:
- Either, as shown, by the upper plate 15 of S1 (if S1 is indeed included in the lordotic curvature, as is normally the case) and the upper plate of the vertebra of the lordotic curvature with the highest latitude (L1 in the example shown);
- Or by the lower plate of the lumbar vertebra with the lowest latitude and the upper plate 49 of the vertebra of the lordotic curve with the highest latitude, especially if S1 is not included in the lordotic curve.

The angle of thoracic kyphosis noted TK in FIG. 5b can be calculated as the angle formed by the lower plate 50 of the vertebra of kyphotic curvature having the lowest latitude (T12 in the example shown), and the upper plate 51 of the vertebra of kyphotic curvature having the highest latitude (T1 in the example shown).

Two distances "d" and "D" are defined, which are shown in FIG. 5c, and whose ratio d/D is called the "Balance Ratio" (BR).

"d" is the difference in abscissa, on a horizontal axis H, between the point of intersection 52 of the diagonals connecting the four vertices of the vertebral body of C7, seen in the sagittal plane, and the posterior edge 53 of the sacral plateau 15.

The vertical axis 18 to which said horizontal axis H is perpendicular is the axis passing through point 52 and formed by the points plumb with point 52 when the patient is standing. This vertical axis 18 corresponds to what orthopaedic surgeons commonly call the "C7 plumbline".

"D" is the difference in abscissa, on the same horizontal axis H, between the posterior edge 53 of the sacral plateau 15 and the centre of the segment joining the centre of each of the two circles 9, 10 symbolising the patient's femoral heads seen in the sagittal plane.

The size "d" is positive if the vertical plumb of C7 is in front of the plumb of the posterior edge of the sacrum, negative otherwise.

The size "D" is positive if the plumbline of the posterior edge of the sacrum is behind the plumbline of the centre of the femoral heads, negative otherwise.

If d/D is −10% to +50%, the general equilibrium ratio BR is correct, as shown in FIG. 5c. If not, there is a more or less pathological BR general balance ratio. A d/D ratio between 50% and 100% is a sign of a slight previous imbalance in the patient. A d/D ratio greater than 100% is representative of a C7 plumbline located anterior to the femoral heads, and a d/D ratio less than −10% is representative of a C7 plumbline located significantly posterior to the femoral heads.

Figure 6:
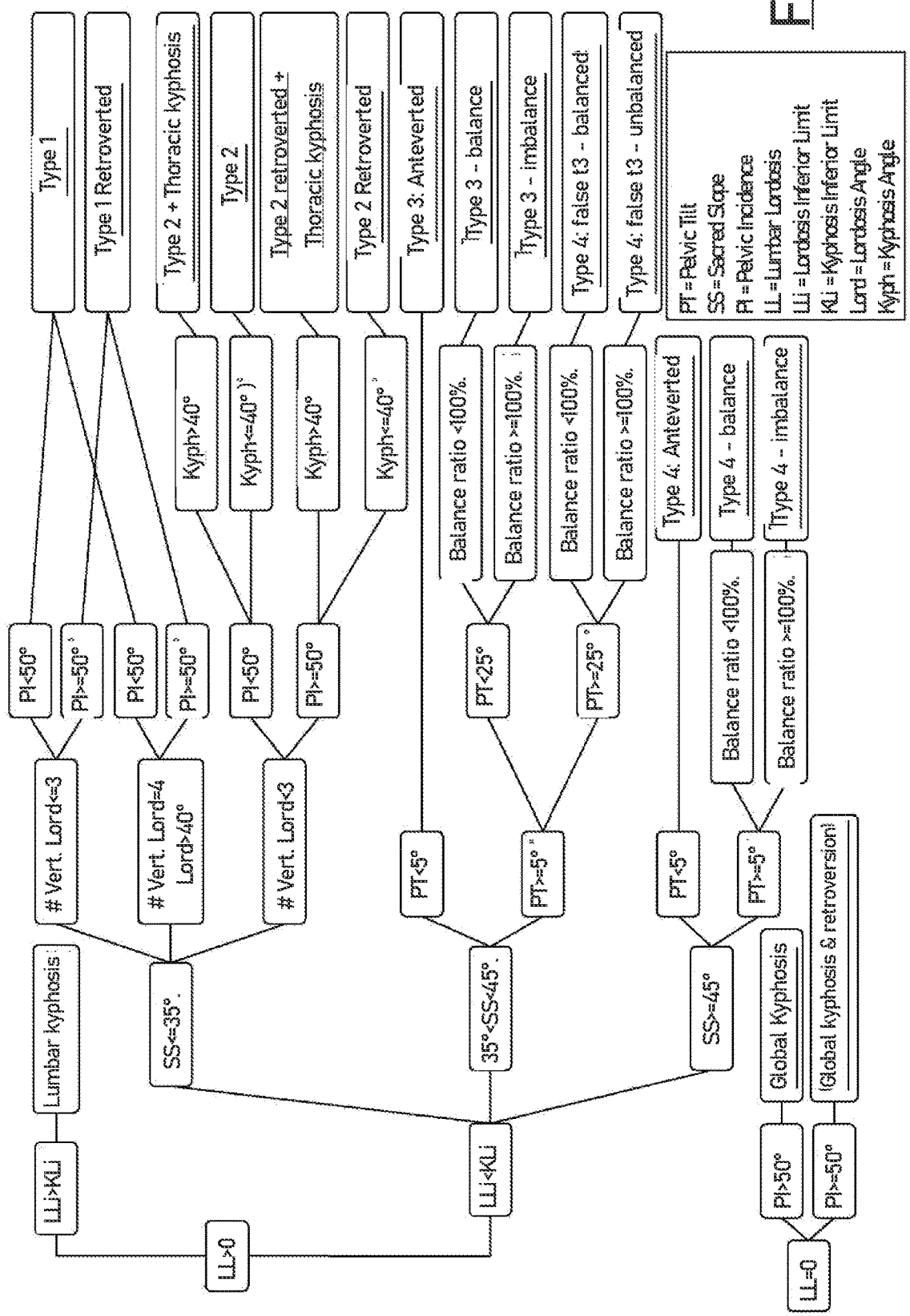
FIG. 6 shows how the various quantities illustrated in FIG. 5 can be used to classify a healthy or pathological spine.
Figure 8:
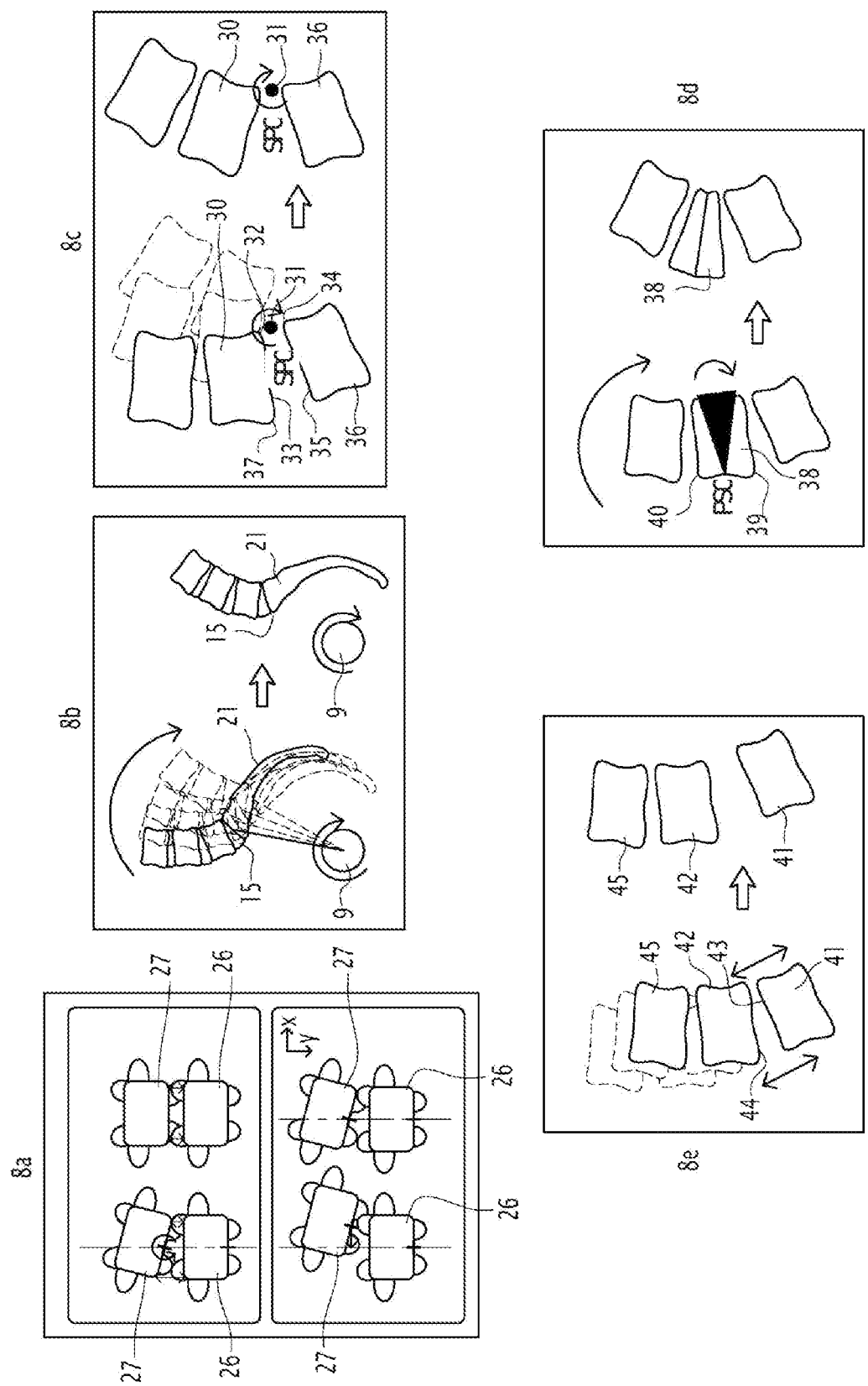
FIG. 8 schematically shows the general principle of using the five tools according to the invention to model the straightening of a portion of the spine, namely FIG. 8a seen in the frontal plane for the first tool, FIG. 8b seen in the sagittal plane for the second tool, FIG. 8c seen in the sagittal plane for the third tool, FIG. 8d seen in the sagittal plane for the fourth tool, and FIG. 8e seen in the sagittal plane for the fifth tool.

Following the calculation of each of the above-mentioned parameters, the invention makes it possible to classify the examined spines into different types of backs that can be considered as "healthy" or "pathological". FIG. 6 shows an example of such a classification. "Type 1", "Type 2", "Type 3 balanced", and "Type 4 balanced" backs are considered healthy. The other types of backs are pathological.

In this example, healthy back types are deemed straight in the frontal plane and classified into four categories called "Roussouly types" which result from the analysis of a population of more than 646 individuals without spinal pathologies and for whom the above-mentioned parameters were measured and statistically analysed in the sagittal plane (see the article "Description of the Sagittal Alignment of the Degenerative Human Spine" (A. Sebaaly, P. Grobost, L. Mallam, P. Roussouly), European Spine Journal (2018) 27: 489-496).

Thus, patients are classified according to:
- The shape of their pelvis taking into account the pelvic incidence IP;
- The positioning of their pelvis, taking into account the sacral slope SS or the pelvic tilt PT to detect the existence of compensations;
- The shape of the spine, taking into account:
  - The length in number of vertebrae of the lordotic curvature, and its position on the spine (for example, in some very pathological cases, the first curvature may be kyphotic; and in extreme cases, the entire spine may be kyphotic);
  - The maximum angular values of each of the lordotic and kyphotic curvatures calculated dynamically as described above.
- The overall balance of the patient using the balance ratio values If the patient has been classified as one of the four healthy back types, there is, by definition, no need for vertebral realignment. If, on the other hand, the back belongs to one of the pathological types listed in FIG. 6, the "healthy" back type to which the patient should correspond is deduced using the correspondence table in FIG. 7.

Figure 9:
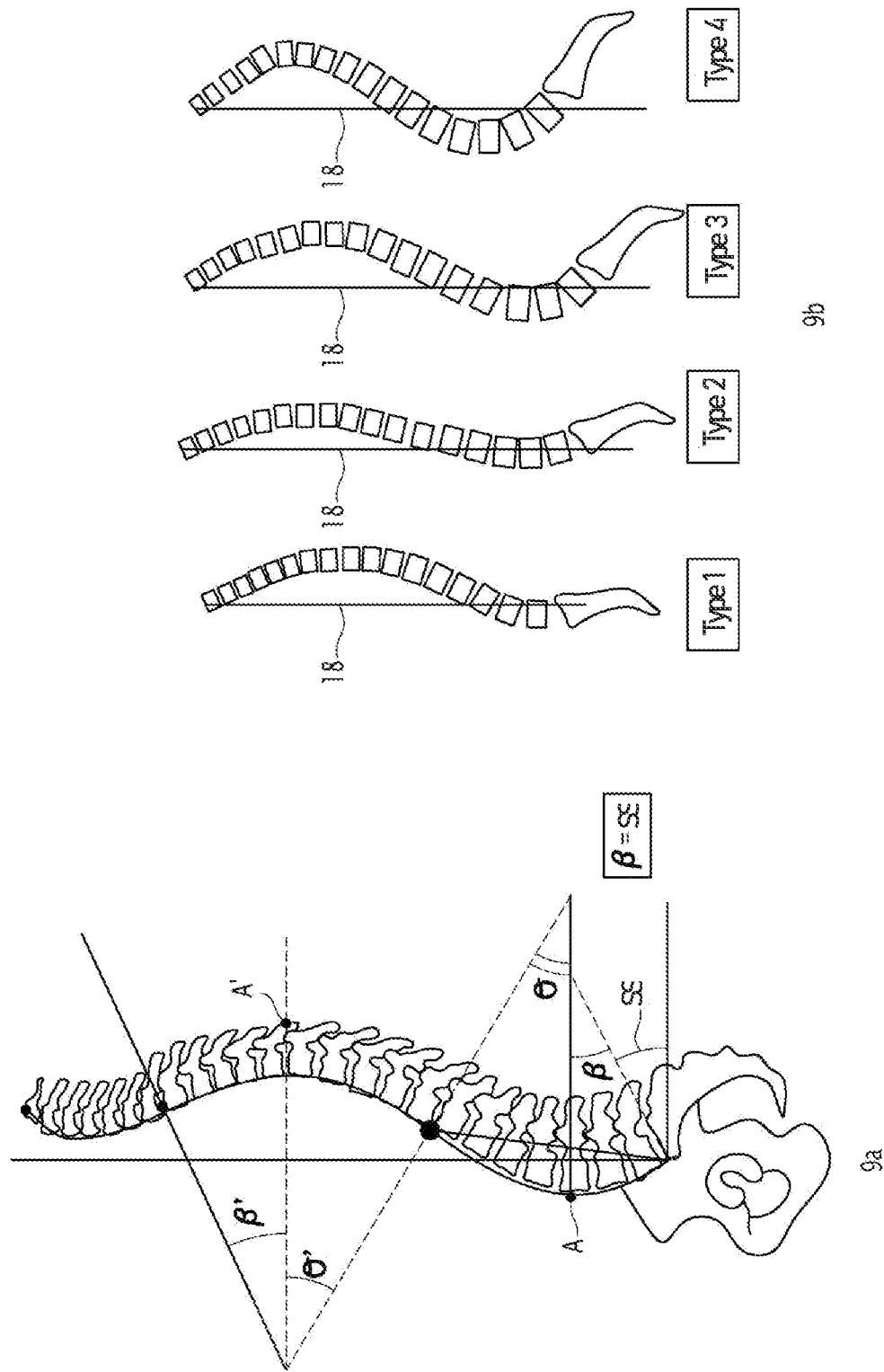
FIG. 9 schematically shows in the sagittal plane a healthy spine and the different quantities that make it possible to characterize its shape (FIG. 9a) and the different types of healthy spines classified according to the four-types Roussouly classification (FIG. 9b).

The classification of healthy backs, the principle and conditions of which are therefore known in themselves, will be better understood with the help of FIG. 9.

FIG. 9a shows a spine and pelvis of common healthy type 3 configurations as defined below (including the cervical vertebrae which, apart from C7, have not necessarily been included in the modelling implemented by the invention), and representative points and magnitudes have been marked which contribute to the classification of the patient's back into one of the four aforementioned categories of healthy backs and which will be detailed below.

FIG. 9a shows:
- the SS sacred slope as defined above;
- Point A (called the apex), which is the most anterior point of the anterior face of the lordotic part of the spine;
- the angle β called "inferior arch of the lordosis" which is the angle formed by the sacral plateau 15 and the horizontal passing through A;
- the IP inflection point, which is the anterosuperior point of the vertebral plate of a vertebra (T11 in the case shown) where the spine changes from a lordotic to a kyphotic configuration;
- the point A' (which is another apex), which is the most posterior point on the anterior face of the kyphotic part of the spine;
- the angle θ, known as the "superior arch of the lordosis", which is the angle formed by the horizontal line passing through A and the vertebral plate of the vertebra to which the inflection point IP belongs;
- the angle θ, known as the "inferior arch of the lordosis", which is the angle formed by the horizontal line passing through A' and the vertebral plate of the vertebra to which the inflection point IP belongs;
- the angle β', known as the "superior arch of the kyphosis", which is the angle formed by the horizontal line passing through A' and the upper vertebral plate of the T1 vertebra.

According to this classification, the spino-pelvic organizations of healthy subjects are subdivided into four back types, illustrated in FIG. 9b.

Type 1 has two to four vertebrae (three in the example shown) in the lordosis, which has only one radius of curvature and is surmounted by a more or less pronounced thoracolumbar kyphosis; the sacral slope SS is low, less than or equal to 35°;

Type 2 corresponds to low sacral slopes SS (less than or equal to 35°). As can be seen in FIG. 9b, the spinal curvatures are not very pronounced; the lordosis extends over four or more vertebrae (six in the example shown);

Type 3 corresponds to medium sacral slopes SS (greater than 35° and less than 45°), with pronounced spinal curvatures and lordosis of four or more vertebrae (six in the example shown).

Type 4 corresponds to large sacral slopes (greater than or equal to 45°) with very pronounced spinal curvatures and a lordosis of four or more vertebrae (seven in the example shown).

As can be seen in the general diagram of spino-pelvic organization in FIG. 9, for types 2 to 4 each spinal curvature (the lordosis which brings the spine backwards, and the kyphosis which projects it forwards) is broken down into two sub-curvatures (lower arch/upper arch) with different radii of length These sub-curvatures are delimited by the apexes seen previously (A for lordosis and A' for kyphosis, see FIG. 9a) which are junction points where the tangent to the curve passing through the centre of the vertebral bodies is perfectly vertical. It can be seen geometrically that the inferior arch β of the lordosis is equal to the sacral slope SS. It was also observed that the superior arch θ of the lordosis is constant, and close to 20° whatever the type of back. The inferior arch θ' of the kyphosis also measures around 20° while the superior arch β' of the kyphosis is also constant at around 30°.

For type 1, the lordosis has only one radius of curvature, usually very acute. The kyphosis is called thoracolumbar because it extends not only into the thoracic region, but also into the lumbar region (it includes L2 and L1, sometimes also L3).

The invention therefore allows the points characterising the spine model as produced from the patient's imaging to be transformed into one of the four healthy configurations that are intended to be achieved by surgery. For this purpose, five tools are offered to the user who can use them in succession to obtain the model of the spine in the corrected state targeted by the surgeon. This will provide the surgeon with a list of corrective actions to be implemented during surgery to achieve this state of equilibrium based on the modelling of the pathological spine as described in the following figures, and will allow the surgeon to deduce the shape of the fixation rods required to achieve this state of equilibrium.

The aims are as follows:
The adjustment of the angulation between the intervertebral disc plates on the segment of the spine operated on;
The adjustment of the angulation between the upper and lower plates of each vertebral body on the segment of the spine operated on;
The height adjustment of the discs on the operated spine segment;
The expected good relative positioning of the sacral plateau and the centre of the femoral heads following surgery;
The expected post-surgical change in angulation of the intervertebral discs underlying and overlying the operated spine segment.

A first tool, the effect of which is illustrated in FIG. 8a, realigns the vertebrae 26, 27 in the frontal plane according to a percentage of realignment ranging from 0% (no change) to 100% (perfect parallelisation and vertical alignment of the lower plates of each vertebral body seen in the frontal plane). For each disc separating two adjacent vertebrae Vn (the upper vertebra) 27 and Vn−1 (the lower vertebra 26), the angle formed by the lower plate of vertebra Vn and the horizontal, and the difference in abscissa between the centre of the lower plate of vertebra Vn and the centre of the lower plate of vertebra Vn−1 are calculated in frontal view. It is then possible to reduce this angle and distance to 0 if we set the correction parameter to 100%, which produces a perfect realignment of the vertebrae Vn and Vn−1 in the frontal plane, or to leave a part of this angulation and distance proportional to the percentage of realignment set. For example, if we set this percentage at 50%, the angulation between the lower plate of each vertebra and the horizontal will be reduced by half, by rotation of the vertebra around the centre of its lower plate. The difference in abscissa between the middle of the lower plate of each vertebra and that of the adjacent vertebra with a lower latitude will also be halved by translation along a horizontal axis.

A second tool, illustrated in FIG. 8b, allows the model of the sacral plateau 15 to be rotated in the sagittal plane with respect to the centre of the segment joining the centre of the two spheres 9 symbolising the femoral heads, by playing on the correction of the tilt PT (also called "pelvic slope"), in order to simulate the cancellation of the pelvic compensation following the correction of the spinal curves. This tool geometrically allows for the rotation of all points symbolising the sacral plateau 15 and the vertebral bodies, with the centre of rotation being the centre of the patient's femoral heads 9.

A third tool, shown in FIG. 8c, allows the angulation between the adjacent endplates of each intervertebral disc (discs not shown; they fill the spaces between the vertebral bodies) in the sagittal plane by rotating each vertebra at a latitude greater than that of the disc to simulate the effect of a "Smith Petersen" type transforaminal osteotomy, and/or the lordosis effect of an arthrodesis aligning the vertebral bodies 30, 36 on the previously bent fixation rod. The centre of rotation is the middle of the segment 31 joining the posterior-inferior apex 32 of the plate of the vertebral body of the overlying vertebra 30 and the posterior-superior apex 34 of the plate of the vertebral body of the underlying vertebra 36. The rotation concerns all points overlying the intervertebral disc under consideration, including the two points 32, 37 corresponding to the ends of the lower plate 33 of the vertebral body of the overlying vertebra 30. This rotation is called "SPO" correction A fourth tool, illustrated in FIG. 8d, is used to modify the angulation between the lower and upper plates of each vertebra 38 in the sagittal plane, by performing a rotation, the centre of which is the centre of the segment joining the anteroinferior apex 39 and the anterosuperior apex 40 of the vertebral body of the vertebra 38 in question. The rotation concerns all points whose ordinate is greater than that of the centre of rotation, and is called a "PSO" correction because it will require the subtraction of a triangular portion of the vertebral body, similar to the operation called "Pedicle Substraction Osteotomy" traditionally performed in orthopaedic surgery.

A fifth tool, illustrated in FIG. 8e, allows the height of a disc (not shown), defined as the length of the segment perpendicular to the upper plate 43 of the vertebral body of the underlying vertebra 41, joining the middle of the latter to the point of intersection with the lower plate 44 of the overlying vertebra 42, to be modified by translating all the points overlying the disc, including the points forming the lower plate of the overlying vertebra, over a user-defined distance. This correction is called "disk height" or "correction cage". It corresponds to the effect of inserting an interbody cage into a patient's disc.

The present invention allows the transformation of the three-dimensional elliptical cone frustum model (see FIG. 3) of a spine using each of the five aforementioned tools in turn, either at the discretion of the user or according to any algorithm that achieves the correction objectives for each of the back types defined in FIG. 7.

For example, in a first step, whatever the type of pathological back, tool 1 is used by setting the correction in the frontal plane to 100% on all the vertebrae of the spine. The middles of the lower plates of each vertebral body will be vertically aligned, and the lower plates of each vertebral body will assume a perfectly horizontal position, as described above for the tool 1 described in FIG. 8a.

In a second step, in the sagittal plane, the second tool is used to correct the pelvic tilt PT to between 10% and ⅓ of the pelvic incidence PI, thus restoring a theoretical pelvic positioning consistent with that of a healthy individual. Its action can be seen in the sagittal plane in FIG. 8.b. By means of this second tool, the image of the sacrum 21 is rotated, taking as the centre of rotation the middle of the segment that joins the centres of the two circles 9, 10 symbolising the femoral heads. This imposes the desired value on the pelvic tilt PT, restoring a theoretical pelvic position consistent with that of a healthy individual who would not require pelvic compensation.

In a third step, if the patient corresponds to a back type whose restoration goal is a type 2, 3 or 4,
The third tool is used on discs L5-S1, L4-L5 and L3-L4, making identical value corrections in each disc (on a left profile, clockwise rotation) until rot(L3) has a negative sign;
The third tool is used on the L2-L3, L1-L2 and T12-L1 discs to obtain a lordosis angulation between the lower plate of L3 and the lower plate of T12 equal to 20° (±2°);

The third tool is used on discs T11-T12, T10-T11, T9-T10, T8-T9, T7-T8, T6-T7, T5-T6 in order to obtain a kyphosis angulation between the lower plate of T12 and the upper plate of T5 equal to 20° (±2°);

The third tool is used on discs T4-T5, T3-T4, T2-T3, T1-T2, C7-T1 in order to obtain a kyphosis angulation between the lower plate of T4 and the upper plate of C7 equal to 30° (±2°);

If the equilibrium ratio then reaches the normative values mentioned above, the process is stopped. If not, the fourth tool is used on L4 or L5 until the overall balance ratio GR=d/D reaches so-called normal values (−10% to 100%).

If the patient corresponds to a back type whose restoration goal is a type 1:

The third tool is only used for the discs between L5-S1 and L3-L4. Again, the aim is to achieve an overall balance ratio GR of −10 to +50%;

The third tool is used on all the discs of the lower part of the thoracolumbar kyphosis L2-L3, L1-L2, T12-L1, T11-T12, T10-T11 taking care to keep for each vertebra n, rot(Vn)>rot(L3);

If the overall GR balance ratio reaches the normative values mentioned above, the process is stopped; otherwise, the fourth tool is used on L4 or L5 until the overall GR balance ratio reaches so-called normal values (−10% to 100%).

Once the elliptical cone frustum model of the vertebrae and their alignment has been modified to reproduce a vertebral alignment deemed suitable by the practitioner in accordance with the correspondence table in FIG. 7, i.e., generally in line with the configurations observed in non-pathological populations (pelvic position, angulation between the vertebral bodies, plumbness of C7 in relation to the sacrum and the femoral heads) according to the patient's back type, a point cloud is calculated to describe a curve passing through the centre of each vertebral body on the segments that have been modified by the simulation.

By following the alignment of the vertebral pedicles and positioning at the level of the posterior arches of the vertebrae, it is possible to define a curve characterising the desired reduction position of the deformed spine after virtual correction, from which it is possible to extract the shape to be given to each of the two fixation rods, by constructing two other point clouds, each located on either side of the first one, and which define the shapes that each of the rods will take after their bending before being implanted on the patient's spine.

When the correction is ideal, parallelism of the two rods is achievable, except in the lowest part of the lumbar spine, when the rods have to be fixed to the patient's iliac bones. If this is the case, the attachment points of the rods on each of the iliac bones are significantly further apart than the attachment points of the rods on a single vertebra. It is then preferable to start increasing the distance between the two rods at the level of the last lumbar vertebrae, so as not to have to deform the rods too abruptly, with the risk of weakening the rods that a sudden variation in their radii of curvature would provide.

However, in deformity surgery and particularly in adults, a certain degree of deformity in the frontal plane (residual scoliosis) is sometimes necessary. In this case, parallelism of the rods is no longer possible, and each rod must be evaluated according to the combination of frontal residual curvatures and sagittal corrections, which impose locally different radii of curvature for each of the rods, to the point of rendering the two rods of the spinal arthrodesis device frankly non-parallel, at least in certain portions of the spine.

The two point clouds that are deduced from the initial point cloud, i.e. the one passing through the centres of the vertebral bodies, make it possible to deduce the precise shape to be given to each of the rods. They pass through a series of theoretical points located on either side of the curve passing through the centre of the vertebral bodies in the frontal plane, and posterior to the latter in the sagittal plane to correspond to the location of the connector of each implanted pedicle screw. It is therefore necessary, if warranted, to provide for an offset between the actual location of the screw on the vertebra and the corresponding point in the point cloud deduced from the initial cloud and through which the rod must pass. This offset should be set according to the type of instrumentation, in particular the type of connector used at that particular point in the spine to connect the rod to the screw and the distance it imposes between the axis of the rod and the axis of the screw.

Figure 10:
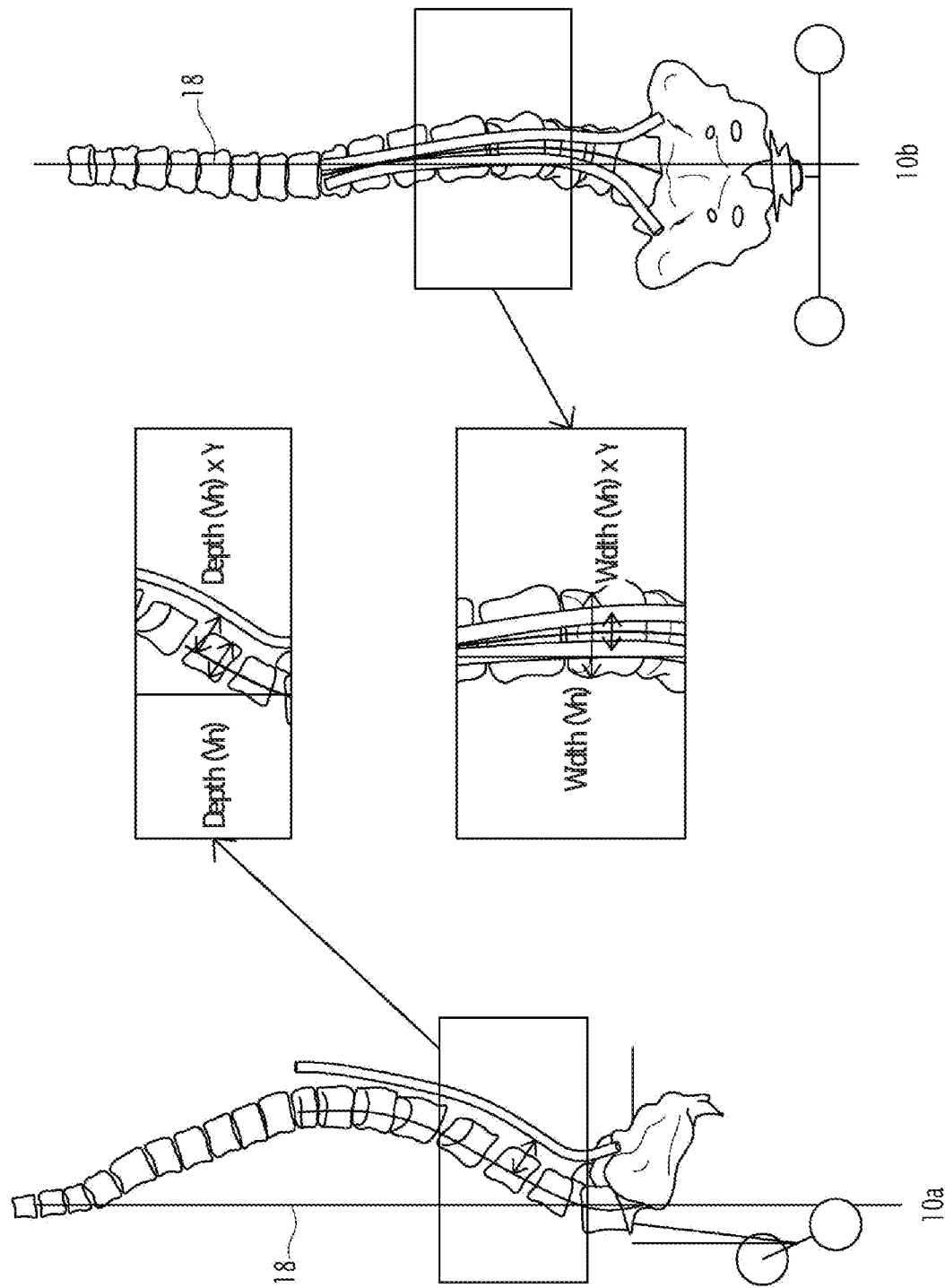
FIG. 10 shows how the point clouds used to define the geometry of the rods to be manufactured are distributed on either side of the curvature passing through the centre of the realigned vertebral bodies in sagittal views as in FIG. 10a and in frontal views as in FIG. 10b.

Thus, FIG. 10 shows how the point clouds used to define the geometry of the rods to be manufactured are distributed on either side of the theoretical curvature 54 passing through the centre of the realigned vertebral bodies in sagittal views as in FIG. 10a and in frontal views as in FIG. 10b. Two parameters X and Y which are a function of the depth and width of the vertebral body of each vertebra concerned by the arthrodesis must be set. They depend on the type of instrumentation used and allow the positioning of the curvatures of each rod respectively posterior to the sagittal curve and on either side of the frontal curve passing through the centre of the vertebral bodies.

Figure 4:
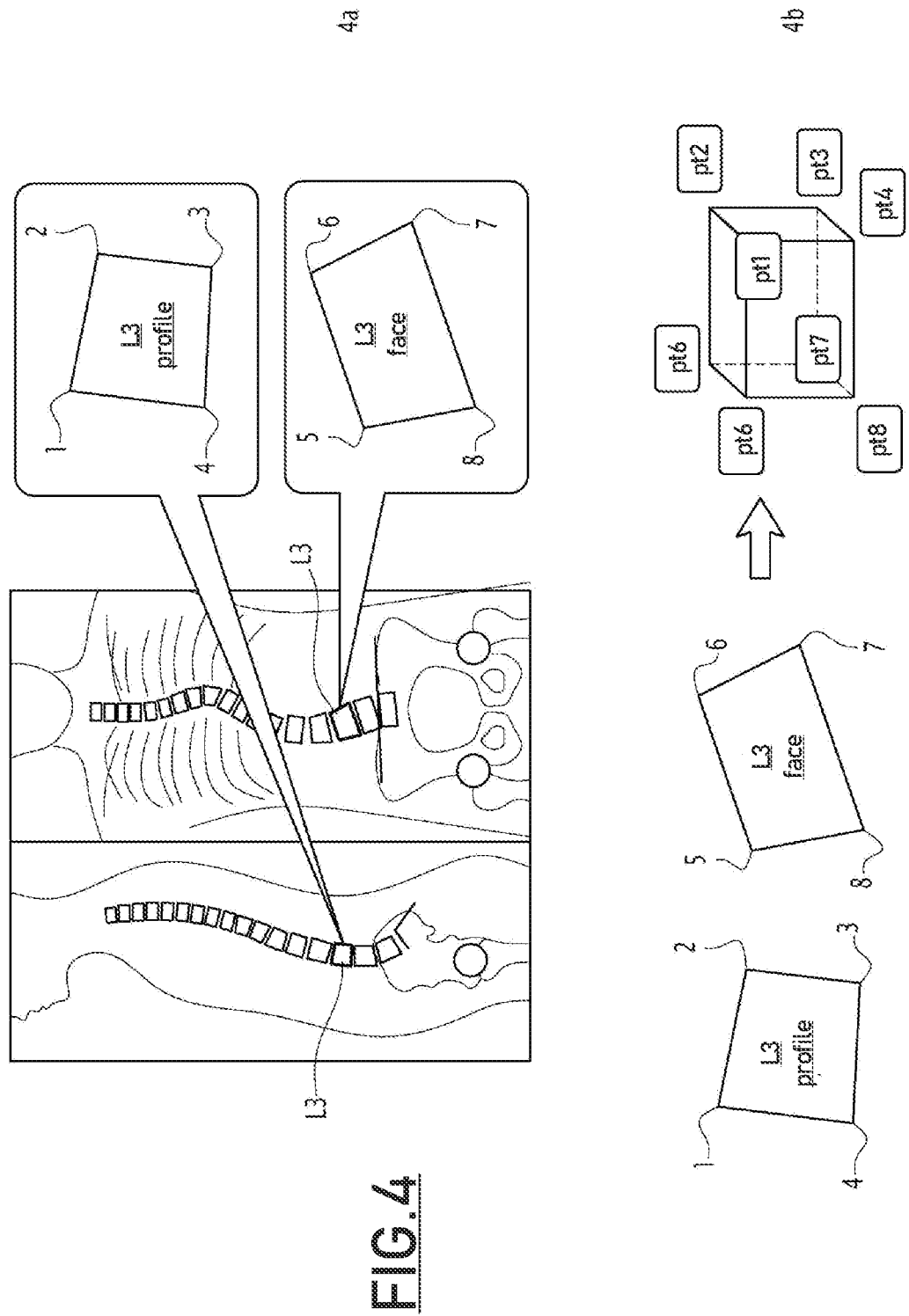
Figure 11:
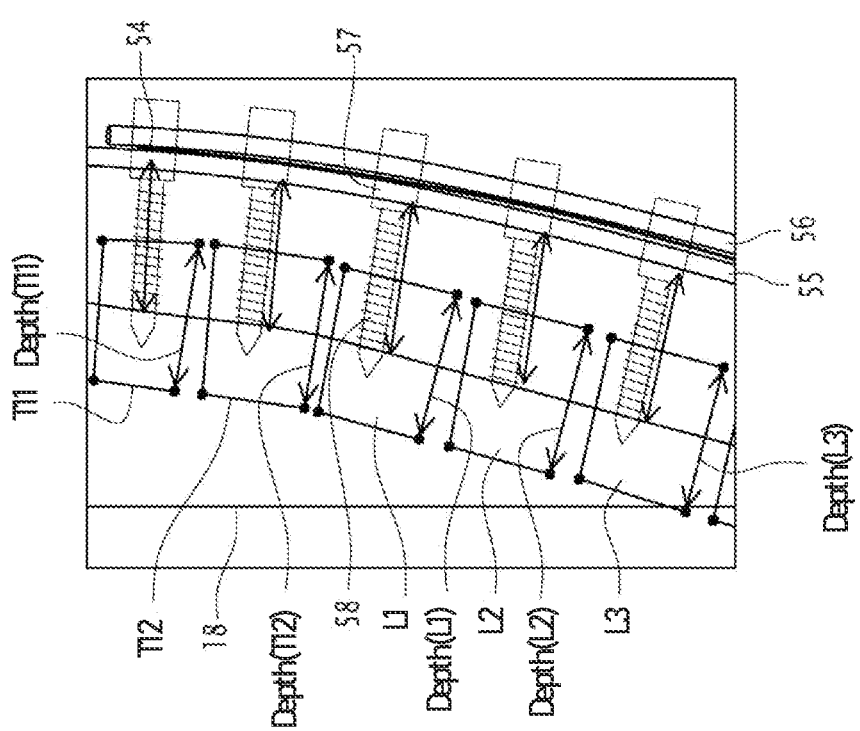
FIG. 11 schematically shows in the sagittal plane how the screws are typically implanted on a part of the spine, with the rods in place in the connectors inserted on the screws.

Thus, as can be seen, for example, in FIG. 11, for which devices have been chosen, each with a side-loading connector 57 of the so-called "low profile" type inserted on a rod ("post") extending the threaded part 58 of the screw, first of all in the sagittal plane for a real patient on the instrumented segment from T11 to L3, for each vertebral body T11, T12, L1, L2, L3, it is possible to calculate a distance ratio between:

the depth Prof(T11), ProfT(12), Prof(L1), Prof(L2), Prof(L3) of said vertebral body, seen in the sagittal plane and represented by the quadrilateral defined previously during the modelling (see FIG. 4);

and the distance between the centre of the vertebral body T11, I12, L1, L2, L3 (the point of intersection of the diagonals of the quadrilateral representing said vertebral body) and the axis of the rod 55 implanted posteriorly on that body and positioned in the connector 57 corresponding to the screw implanted in said vertebral body.

An example of a corresponding measurement table is shown in FIG. 11. In the case under consideration, by positioning the curve 54 describing the theoretical rod posteriorly to the curve passing through the centre of the realigned vertebral bodies after planning with a parameter X=1.15 times the length of the lower plate of the vertebral body for each level, we obtain a rod that is very close to the one that the surgeon has actually implanted: the differences between the real distance between the axis of the rod 55 and the centre of the vertebral body on which the corresponding screw is implanted are on the order of ±1%. It is therefore possible to achieve a high degree of precision in the shaping and installation of the rods 55, 56 and the screw-connector assemblies 57, 58.

The same logic can be applied to the curvature in the frontal plane, this time applying a parameter Y, on either side of curve 54 passing through the centre of the vertebral bodies T11, T12, L1, L2, L3.

The surgeon performs the bending of each of the rods according to the indications provided by the design method of the rods according to the invention. This bending can be done with a bending machine that the surgeon uses according to the indications provided by the previously described modelling. However, it is preferable, for obvious reasons of ease, speed of execution and precision of the bending, that this operation be carried out by means of numerically controlled machines known in themselves. For this purpose, the desired geometry for a given rod is converted into computer data in the conventional way and this data is transmitted to the bending machine.

If necessary, additional points can be added to each of the clouds used for shaping a rod. These additional points do not necessarily correspond to particular points of the spine in its corrected position, but serve to give indications to the surgeon, or to program the bending machine, so as to make the changes in curvature of the rod between two anchoring points more gradual. Less stress is thus applied to the rod during its shaping, thus limiting the risks of cracking or even breaking the rod during its shaping and after its implantation on the patient's spine.

The invention claimed is:

1. A method of designing a pair of fixation rods for implantation in a spine of a patient suffering from spinal pathology during posterior spinal arthrodesis, wherein:
    a three-dimensional model of the pathological spine is constructed as follows:
        at least one image of the patient's spine to be treated is taken using a medical imaging method, each of the at least one image showing the spine in a corresponding plane, the at least one image comprising an image in whose corresponding plane is a sagittal plane, the at least one image further comprising an image whose corresponding plane is a frontal plane in anterior view if said pathology is three-dimensional, the patient being in a same position for each one of the at least one image, each of said at least one image covering at least an area of the spine extending from cervical vertebra C7 to an end of a sacrum and including femoral heads of the patient;
        from said at least one image, morphological reference points are acquired by placing points on four vertices of each vertebral body seen in two-dimensional projection in the plane in which each of the at least one image was taken, so as to define contours of said vertebral bodies on each of the at least one image by a quadrilateral;
        a simplified three-dimensional model of each said vertebral body is constructed from said at least one image as an elliptical cone frustum for which each said vertebral body is represented in the corresponding plane of said at least one image, by the quadrilateral defined by the four points placed on the four vertices of each said vertebral body seen in two-dimensional projection in said at least one plane, where each said vertebral plate is represented by an ellipse;
        a sacral plateau is defined by an elliptical disc in the frontal plane to take account of inclination of the sacrum in the sagittal plane;
        if there is no deformation of the spine in the frontal plane, the sacral plateau is further defined by a segment in the sagittal plane;
        if there is a deformation of the spine in the frontal plane at its level, the sacran plateau if further defined by an elliptical disc in the sagittal plane;
        projections of the contours of the femoral heads in the planes of the at least one image are defined by circles;
        a segment that connects centers of the circles representing the femoral heads if the projections of the femoral heades in the sagittal plane are offset, or the point representing the centers of said circles if the circles are merged in the sagittal plane, is defined;
        pelvic indicence, sacral slope and pelvic tilt are measured in the at least one image;
        a "C7 plumbline" of the spine is defined on the at least one image and taken as a vertical axis of reference, passing through a point in a middle of the vertebral body;
        a general balance ratio d/Dis defined, where d is a distance between the vertical axis passing through a middle of the C7 vertebra and a vertical axis passing through a posterior end of a segment representing the sacral plateau in the sagittal plane, and D is a distance between a vertical axis passing through said posterior end of the segment representing the sacral plateau in the sagittal plane and a middle of the segment that connects the centers of the circles representing the femoral heads or the point representing the center of said circles if the circles are merged in the sagittal plane;
        the limits of the lordotic and kyphotic curvatures are defined on the at least one image and a number of vertebrae included in lumbar lordosis is calculated;
    said three-dimensional model is used to classify the patient's pathological spine into a given category of a pre-established classification of pathological or healthy back types, and a future corrected position of the vertebrae of the spine is derived therefrom and aimed at, if necessary, said future corrected position falling within a pre-established said category of healthy back types;
    the patient's spine is modelled in the future corrected position, taking into account configurations and positions of the vertebral bodies of the spine, the sacral plateau and the femoral heads, using five tools in succession based on said three-dimensional model:
        using a first tool, the vertebrae are realigned in the frontal plane, according to a percentage of realignment ranging, for each said vertebra, from 0%, which corresponds to an absence of realignment, to 100%, which corresponds to perfect parallelism of lower plates of each said vertebral body in the frontal plane and to vertical alignment of middles of said lower plates;
        using a second tool, the model of the sacral plateau is rotated in the sagittal plane with respect to the center of the segment joining the centers of the two spheres symbolizing the femoral heads by altering correction of the pelvic tilt;
        using a third tool, angulation in the sagittal plane between adjacent said plates of each intervertebral disc to be operated on is modified by performing a rotation on each said vertebra, a center of the rotation being a center of the segment joining a posteroinferior edge of the vertebral body plate of the overlying said vertebra and a posterosuperior edge of the vertebral body plate of an underlying vertebra, and the rotation concerning all points overlying the intervertebral disc under consideration, including the two points of the lower vertebral body plate of the overlying vertebra;

using a fourth tool, the angulation between upper and said lower plates of one or two vertebrae is modified in the sagittal plane, as would be done during a transpedicular osteotomy correction, by performing a rotation whose center is a center of a segment joining an anteroinferior edge and an anterosuperior edge of the vertebral body of the vertebra in question, the rotation concerning all the points whose ordinate is greater than that of the center of rotation;

and using a fifth tool, a height of each disc, defined as a length of a segment perpendicular to the upper plate of the vertebral body of the underlying vertebra, joining a middle of the upper plate of the vertebral body of the underlying vertebra to a point of intersection with the lower plate of the overlying vertebra, is modified in succession by performing a translation for all points overlying the disc, including points forming the lower plate of the overlying vertebra, over a user-defined distance;

a first point cloud is calculated defining a curve passing through the centers of the vertebral bodies on the segments of the spine that have been modified by the model compared to the model of the pathological spine;

two other point clouds are deduced, each located on a respective side of the first point cloud, spaced in the frontal plane by a distance equivalent to a width of the vertebra multiplied by a factor X, and located in the sagittal plane posterior to the first point cloud at a distance equivalent to the depth of the vertebra in the sagittal plane multiplied by a factor Y, each of said other point clouds defining a curve corresponding to the shape to be imposed on one of the rods of said pair of fixation rods, said factors X and Y making possible to position the configuration curves of the fixation rods on either side of the curve passing through the center of the vertebral bodies in the frontal and sagittal planes as a function of a type of instrumentation intended to be used to connect the corresponding fixation rod to the spine.

2. The method according to claim 1, wherein when using the fifth tool, said translation is combined with a rotation about the center of rotation of the third tool where it is located after the translation performed by said fifth tool, to restore the height of the disc concerned to a height corresponding to that of a healthy, uncompressed disc.

3. The method according to claim 2, wherein said three-dimensional model of the pathological spine is carried out by a computer.

4. The method according to claim 2, wherein said two other point clouds are converted into data usable by a rod bending device.

5. The method according to claim 2, wherein said pre-established category of healthy back types is a Roussouly classification.

6. A method of manufacturing a fixation rod for implantation in the spine of a patient suffering from spinal pathology during posterior spinal arthrodesis, wherein:
the method of designing a pair of fixation rods to be implanted on the spine of a patient suffering from a spinal pathology according to claim 2, is carried out to determine the shape to be taken by said fixation rod, from one of said two other point clouds;
and shaping at least one fixation rod of said pair of fixation rods by use of a bending machine, to give said fixation rod the shape said fixation rod is to take, wherein said two other point clouds are converted into data usable by a rod bending device.

7. The method according to claim 1, wherein said three-dimensional model of the pathological spine is carried out by a computer.

8. The method according to claim 7, wherein said two other point clouds are converted into data usable by a rod bending device.

9. The method according to claim 7, wherein said pre-established category of healthy back types is a Roussouly classification.

10. A method of manufacturing a fixation rod for implantation in the spine of a patient suffering from spinal pathology during posterior spinal arthrodesis, wherein:
the method of designing a pair of fixation rods to be implanted on the spine of a patient suffering from a spinal pathology according to claim 7, is carried out to determine the shape to be taken by said fixation rod, from one of said two other point clouds;
and shaping at least one fixation rod of said pair of fixation rods by use of a bending machine, to give said fixation rod the shape said fixation rod is to take, wherein said two other point clouds are converted into data usable by a rod bending device.

11. The method according to claim 1, wherein said two other point clouds are converted into data usable by a rod bending device.

12. The method of claim 11, wherein the rod bending device is a numerical control bending machine.

13. A method of manufacturing a fixation rod for implantation in the spine of a patient suffering from spinal pathology during posterior spinal arthrodesis, wherein:
the method of designing a pair of fixation rods to be implanted on the spine of a patient suffering from a spinal pathology according to claim 12, is carried out to determine the shape to be taken by said fixation rod, from one of said two other point clouds;
and shaping at least one fixation rod of said pair of fixation rods by use of a bending machine, to give said fixation rod the shape said fixation rod is to take, wherein said two other point clouds are converted into data usable by a rod bending device.

14. The method according to claim 11 wherein said pre-established category of healthy back types is a Roussouly classification.

15. A method of manufacturing a fixation rod for implantation in the spine of a patient suffering from spinal pathology during posterior spinal arthrodesis, wherein:
the method of designing a pair of fixation rods to be implanted on the spine of a patient suffering from a spinal pathology according to claim 11, is carried out to determine the shape to be taken by said fixation rod, from one of said two other point clouds;
and shaping at least one fixation rod of said pair of fixation rods by use of a bending machine, to give said fixation rod the shape said fixation rod is to take, wherein said two other point clouds are converted into data usable by a rod bending device.

16. The method according to claim 1, wherein said pre-established category of healthy back types is a Roussouly classification.

17. A method of manufacturing a fixation rod for implantation in the spine of a patient suffering from spinal pathology during posterior spinal arthrodesis, wherein:
the method of designing a pair of fixation rods to be implanted on the spine of a patient suffering from a spinal pathology according to claim 16, is carried out to determine the shape to be taken by said fixation rod, from one of said two other point clouds;

and shaping at least one fixation rod of said pair of fixation rods by use of a bending machine, to give said fixation rod the shape said fixation rod is to take, wherein said two other point clouds are converted into data usable by a rod bending device.

18. A method of manufacturing a fixation rod for implantation in the spine of a patient suffering from spinal pathology during posterior spinal arthrodesis, wherein:

the method of designing a pair of fixation rods to be implanted on the spine of a patient suffering from a spinal pathology according to claim 1, is carried out to determine the shape to be taken by said fixation rod, from one of said two other point clouds;

and shaping at least one fixation rod of said pair of fixation rods by use of a bending machine, to give said fixation rod the shape said fixation rod is to take, wherein said two other point clouds are converted into data usable by a rod bending device.

19. The method according to claim 18, wherein said bending machine is a numerical control machine to which has been supplied said data which said numerical control machine can operate, obtained from the point cloud corresponding to said at least one fixation rod of the pair of fixation rods.

20. The method of claim 18 wherein the rod bending device is a numerical control bending machine.

* * * * *